United States Patent [19]

Saad et al.

[11] 3,915,728

[45] Oct. 28, 1975

[54] READY-MIXED WALLPAPER PASTE

[76] Inventors: Oscar C. Saad, 25106 Anchorage Drive, Mount Clemens, Mich. 48043; Frederick F. Liro, 8129 Garbor, Warren, Mich. 48093

[22] Filed: Jan. 18, 1971

[21] Appl. No.: 107,568

Related U.S. Application Data

[63] Continuation-in-part of Ser. No. 864,190, Oct. 6, 1969, abandoned.

[52] U.S. Cl. ................. 106/208; 106/210; 106/213
[51] Int. Cl.² ......................... C08L 3/02; C09J 3/06
[58] Field of Search ............ 106/213, 214, 210, 208

[56] References Cited
UNITED STATES PATENTS

| | | |
|---|---|---|
| 2,215,846 | 9/1940 | Bauer.................................. 106/210 |
| 2,856,307 | 10/1958 | Fredrickson..................... 106/213 X |
| 3,351,480 | 11/1967 | Mentzer.............................. 106/210 |
| 3,379,547 | 4/1968 | Huebschmann et al. ........... 106/210 |
| 3,384,498 | 5/1968 | Ahrabi............................... 106/208 |

*Primary Examiner*—Lorenzo B. Hayes
*Attorney, Agent, or Firm*—Whittemore, Hulbert & Belknap

[57] ABSTRACT

A ready-mixed wallpaper paste comprising a blend of starch, dextrin, water and a hydrophilic colloid, a fungicide and/or bactericide may be included in the blend. The starch and dextrin are first mixed with each other and with the fungicide and bactericide used. The mixture is then blended into water. The blend is weighed and approximately 0.3 percent by weight of the blend of the hydrophilic colloid is then added to the blend.

10 Claims, No Drawings

READY-MIXED WALLPAPER PASTE

CROSS REFERENCE TO RELATED APPLICATION

This application is a continuation-in-part of application Ser. No. 864,190, filed Oct. 6, 1969, for "Ready-Mixed Wallpaper Paste", now abandoned.

BACKGROUND OF THE INVENTION

1. Field of the Invention

The invention relates to adhesives and refers more specifically to a ready-mixed wallpaper paste for use in bonding paper, vinyl and other lightweight coverings to walls which makes use of readily available, simple materials, is economical to produce and is efficient in use.

2. Description of the Prior Art

In the past, paste for wallpapering and the like has normally been produced in the form of a powder requiring mixing by the ultimate user. Such pastes have had a short pot life and mixing of the paste, which sometimes requires heating, has been objectionable.

Attempts to eliminate the necessity for mixing wallpaper paste by the ultimate user have also included placing an adhesive on the wallpaper to provide contact paper and placing a dry paste on the wallpaper as it is sold. Both of these attempts to do away with the necessity for the ultimate user to mix wallpaper paste have deficiencies. Thus, the contact type wallpaper must be hung exactly initially since it cannot be moved on a wall in the usual manner of wallpaper having wallpaper paste thereon after it is positioned on the wall. The wallpaper having dry paste thereon has to be dipped in water prior to hanging and is, therefore, hung wet, which is undesirable since the paper is difficult to position on the wall and subject to tearing.

Wet pastes have also been formulated for wallpapering and are still sold for this purpose. Commercially available wet pastes are comprised primarily of clay and polyvinyl acetate bases, or silica bases, and contain up to 75% solids. They have been found expensive, difficult to use, and unsuitable for a wide range of wallcoverings. They lack characteristics such as slip and slide which are necessary for this purpose and are primarily intended (and suited) for heavy duty commercial vinyl wallcoverings. They must be applied to the wall instead of the wallcovering. These pastes have a definite tendency to damage wall surfaces when the wallcoverings are removed at a later time. Prior attempts to provide a wet paste having a starch base have been unsuccessful.

SUMMARY OF THE INVENTION

In accordance with the invention, there is provided a ready-mixed wallpaper paste which is in a solidliquid suspension form and which has a substantially unlimited pot life in a sealed container so that it may be used as desired without mixing by the ultimate user. The paste is a blend of a starch and a dextrin in water with the addition of a hydrophilic colloid for suspending the starch in the water. A suitable fungicide and bactericide may be blended into the paste, if desired. The starch and dextrin are first mixed together with the fungicide and/or bactericide, if used, and the mixture is blended with the water after which a percent by weight of the blend of the hydrophilic colloid is added thereto, and the liquid wallpaper paste is placed in a suitable sealed container in accordance with the method of the invention.

DESCRIPTION OF THE PREFERRED EMBODIMENT

The wallpaper paste of the invention is a ready-mixed liquid paste which has a relatively long pot life similar, for example, to the usual paint when exposed to air and a substantially unlimited pot life in a sealed container. Thus, the ultimate user of the ready-mixed wallpaper paste of the invention does not need to add or blend additional ingredients to the wallpaper paste prior to using the paste.

The wallpaper paste includes a starch such as pregelatinized vegetable starch and any water-soluble dextrin. A water vehicle and hydrophilic colloid complete the necessary ingredients of the ready-mixed wallpaper paste. A fungicide and/or bactericide are desirable ingredients of the ready-mixed wallpaper paste.

Any pregelatinized vegetable starch may be used in the paste. In particular, the pregelatinized starches of wheat, corn and potatoes are preferred because of their availability and price. A particular formulation for pregelatinized wheat starch that has been used successfully in the paste had the following average composition and particle size distribution:

| Nominal Composition | |
|---|---|
| Moisture | 9% by wt. |
| Starch | 82% by wt. |
| Protein | 5% by wt. |
| Fiber | 1% by wt. |
| Ash | 3% by wt. |

| Particle Size Distribution |
|---|
| 98.5% min. through 30 mesh U.S. standard screen. |
| 80% min. through 80 mesh U.S. standard screen. |
| 55% through 200 mesh U.S. standard screen. |

The density of the pregelatinized wheat starch was 0.55 to 0.61 gms/ml, and the Ph was between 3.3 and 5.0.

All known dextrins are suitable for use in the paste. Dextrins produced from vegetable starches such as wheat, corn and potato starches are preferable. Preferably the dextrin used will be cold water soluble to eliminate the necessity of heating during manufacture of the paste. Yellow dextrins are preferable due to their comparable low cost. General specifications for the dextrin are:

| Moisture | 15% by wt. max. |
|---|---|
| Color | No limitation |
| Sugar content | 5% by wt. max. |
| Unchanged starch | 20% by wt. max. |
| Ash | 15% by wt. max. |
| Cold water solubles | 50% by wt. min. |

The hydrophilic colloid employed for the purpose of the invention is an Xanthomonas colloid which is a polymer containing mannose, glucose, potassium glucuronate and acetyl in the approximate molar ratio of 2:1:1:1. In such a colloid, the potassium portion can be replaced by several other cations without substantial change in the property of the said material for the purpose of the invention.

The colloid, which is a high molecular weight, exocellular material, may be prepared by the bacterium, Xanthomonas campestris, NRRL B-1459, by whole culture fermentation of a medium containing 2–5 percent commercial glucose, organic nitrogen source, dipotassium hydrogen phosphate and appropriate trace elements. The incubation time is approximately 96 hours at 28° C., under aerobic conditions.

The preparation of this colloid is not a part of the present invention and will not therefore be considered in further detail herein. For further details of the preparation of the colloid, reference is made to U.S. Pat. No. 3,428,464, the disclosure of which is intended to be incorporated herein by reference.

Suitable products which serve as both bactericide and fungicide are commercially available from the Dow Chemical Company of Midland, Michigan, as:

Dowicide "A" - Sodium O-Phenylphenate . 4 $H_2O$
Dowicide "B" - Sodium 2,4,5 - Trichlorophenate . 1.5 $H_2O$

Dowicide "G" - Sodium Pentachlorophenate . 1 $H_2O$

Other fungicides and bactericides suitable for use in aqueous systems are available and may be used in the wallpaper paste within the scope of the invention.

In producing wallpaper paste, the pregelatinized starch is mixed with the dextrin and the fungicide and/or bactericide, if they are being used. The mixture of starch, dextrin, fungicide and bactericide is then blended into the water. The blend is then weighed and the hydrophilic colloid is added to the blend in an amount equal to a percent by weight of the weighed blend.

The liquid ready-mixed wallpaper paste is then packaged in a suitably closed container which may be of glass, plastic or metal as desired. In use, the ultimate user need only open the container and apply the ready-mixed wallpaper paste to the wallcovering prior to hanging of the wallcovering.

In a specific example, the following exact quantities of ingredients were mixed, blended, weighed and added in accordance with the above indicated method to provide the ready-mixed wallpaper paste of the invention:

Mix the following ingredients:
12.5 lbs. starch (pregelatinized wheat)
3.5 lbs. dextrin
2.1 lbs. Dowicide "A"
Blend the mixture into 192 lbs. of water.
Weigh the total blend.
Add 0.3 percent by weight of total blend, or 0.6 lbs. of the Xanthomonas hydrophilic colloid to the blend.

The ready-mixed wallpaper paste resulting from the specific example was a readily flowable liquid easily applied to wallpaper and permitted movement of the wallpaper during hanging. The pot life of the specific example in a sealed container was substantially unlimited and no noticeable change in the ready-mixed wallpaper paste was evident on exposure to the atmosphere during normal wallpapering periods.

The resulting paste is a highly stable suspension which is resistant to rapid drying at normal temperatures when exposed to air, solid-liquid separation and the formation and growth of bacteria and fungi. The paste is suitable for hanging paper, vinyl, etc., and has excellent adhesive, drying and tack properties.

Vinyl wall coverings bonded with this paste can be removed from a wall and re-used without damage to either the wall or the wallcovering material. Thus, the resulting paste has the characteristic of being strippable.

Typical operative proportions of the above indicated ingredients to produce a wallpaper paste in accordance with the invention are:

| | Example % by Wt. | Preferred % by Wt. Range |
|---|---|---|
| Starch | 5.9 | 5.5 to 7 |
| Dextrin | 1.7 | 1 to 3 |
| Water | 91.1 | 89 to 92 |
| Hydrophilic Colloid | .3 | .25–.50 |
| Dowicide "A" | 1.0 | .90 to 1.25 |

While one embodiment of the invention has been disclosed in detail, it will be understood that other embodiments and modifications of the invention are contemplated. It is the intention to include all embodiments and modifications as are defined by the appended claims within the scope of the invention.

What we claim as our invention is:

1. A ready-mixed liquid paste which is readily spreadable and has a relatively long shelf life comprising a blend of a vegetable starch, a dextrin, water and a *Campestris Xanthomonas* hydrophilic colloid for suspending the starch in the water having the approximate proportions by weight of 5–7 percent starch, 1–3 percent dextrin, and 0.25–0.5 percent hydrophilic colloid and the balance water.

2. A ready-mixed liquid paste as set forth in claim 1, wherein the starch is pregelatinized.

3. A ready-mixed liquid paste as set forth in claim 2, wherein the dextrin is the product of a vegetable starch.

4. A ready-mixed liquid paste as set forth in claim 1, wherein the hydrophilic colloid is an Xanthomonas hydrophilic colloid polymer containing mannose, glucose, potassium glucuronate and acetyl in the approximate molar ratio of 2:1:1:1.

5. The ready-mixed liquid paste as set forth in claim 4, and further including approximately 1.00 percent by weight of at least one of a water soluble fungicide and bactericide.

6. The ready-mixed liquid paste as set forth in claim 5, wherein the fungicide and bactericide is one of Sodium O-Phenylphenate . 4 $H_2O$, Sodium 2,4,5 - Trichlorophenate . 1.5 $H_2O$, and Sodium Pentachlorophenate . 1 $H_2O$.

7. The ready-mixed liquid paste as set forth in claim 1, containing from 5.9 percent by weight of the starch.

8. The ready-mixed liquid paste as set forth in claim 1, containing from 1.7 percent by weight of the dextrin.

9. The ready-mixed liquid paste as set forth in claim 1, containing from 0.3 percent by weight of the hydrophilic colloid.

10. The method of producing a ready-mixed liquid paste which is readily spreadable and has a relatively long shelf life comprising blending by weight approximately 5.9 percent of a vegetable starch and approximately 1.7 percent of dextrin into approximately 91.1 percent water, weighing the starch, dextrin and water blend and adding approximately 0.3 percent by weight of the blend of a *Campestris Xanthomonas* hydrophilic colloid for suspending the starch in the water to the blend.

* * * * *